Dec. 23, 1958     H. G. BLOSSER     2,866,137
VEHICLE WEIGHING SYSTEM
Filed April 13, 1954

INVENTOR.
Herman G. Blosser
BY W. L. Stout
HIS ATTORNEY

United States Patent Office 2,866,137
Patented Dec. 23, 1958

2,866,137

VEHICLE WEIGHING SYSTEM

Herman G. Blosser, Pittsburgh, Pa., assignor to Westinghouse Air Brake Company, Wilmerding, Pa., a corporation of Pennsylvania Application April 13, 1954, Serial No. 422,829

18 Claims. (Cl. 317—139)

My invention relates to a vehicle weighing system. More particularly, my invention relates to a vehicle weighing system which is suitable for, although in no way limited to, use for controlling the braking force applied by an automatic car retarder to the wheels of a railway car in a railway classification yard.

In railway classification yards it is common practice to push the railway cars over a hump to accelerate the cars, and to limit the speed of the cars as they move toward the various classification tracks by means of car retarders having braking bars which frictionally engage the sides of the wheels. The amount of braking force which it is necessary to apply to the cars will usually vary directly with the weight of the cars. It is therefore desirable to provide a suitable means for automatically weighing the cars and for converting the weight information thus obtained into electrical controls which can be used to automatically control the braking force exerted by the retarders in accordance with the weight of the car being retarded.

For the purposes of controlling the braking force, the cars may be classified into weight groups. Cars are usually divided into three weight groups which may be defined as including cars of light, medium and heavy weights. One purpose of the present invention is to determine the weight classification of a car just prior to its entrance into a car retarder so as to provide a basis for controlling the braking force to be applied.

The invention will be described and explained in the manner in which it would normally be used for controlling a car retarder in a railway classification yard. However, it is obvious that the control provided by this invention may be readily used in any roadway application where braking force is applied to a vehicle on the roadway from a source external of the vehicle itself. An example of such a use might be on an amusement park roller coaster.

In order for a control of the type defined by this invention to be effective it must be capable of operating with a certain degree of accuracy and reliability in a varying environment. Where the system is an electrical one, as is the case in this invention, the greatest enemies of accuracy and sensitivity are variations in supply voltage to the system and in temperature. The ambient temperature especially presents difficulties when it is considered that the temperature of the air where the control elements may be situated may range from below zero temperatures to temperatures in the high 90's or 100's. In fact, temperature at a particular installation may easily vary 40 or 50 degrees Fahrenheit during the course of a single day. Applicant's scheme for eliminating faults caused by these factors involves the provision of two substantially identical circuits maintained in substantial equilibrium with respect to each other, one of the circuits having elements for sensing weight and responding thereto to disturb the equilibrium and cause operation of the control. It can be seen that with such a system variations in temperature or voltage supplied to the control will affect each of the circuits to approximately the same degree. The circuits are connected in a bucking relation with respect to each other so that impulses or voltages due to effects such as temperature changes or voltage changes are effectively cancelled. Therefore, with no vehicle affectinig the weight sensitive element, the control will remain in equilibrium condition through changes of temperature or supply voltage. By eliminating these faults the scope of use of these controls is effectively enlarged and a more versatile and reliable control is developed.

It is an object of this invention to provide a weight detecting system for controlling a braking force which is applied to retard a moving vehicle by a braking device associated with the roadway on which the vehicle is traveling.

This invention has for another object the provision of a system for controlling the selection of a braking force in accordance with the weight of the vehicle to be retarded.

This invention also has for an object the provision of a weight detecting system for controlling the braking force which is applied by a car retarder to a railway car.

Still another object of the invention is the teaching of an electrical control for selecting the braking force to be applied to a moving vehicle in accordance with the weight of the vehicle to be retarded wherein the components of the system are constructed and arranged in a manner to compensate for changes in supply voltages to the system and/or in ambient temperature.

It is a further object of this invention to employ a weight sensitive roadway section to vary the air gap in an inductive element included in the control to thereby effect the selection of a braking force to be applied to a vehicle.

Also among the objects of this invention are the construction of a car retarder control actuated from a source of alternating current voltage and a provision of variable means for calibrating the control.

These and other objects of this invention and their attendant advantages will be apparent in the following specification and drawings in which.

Figure 1:
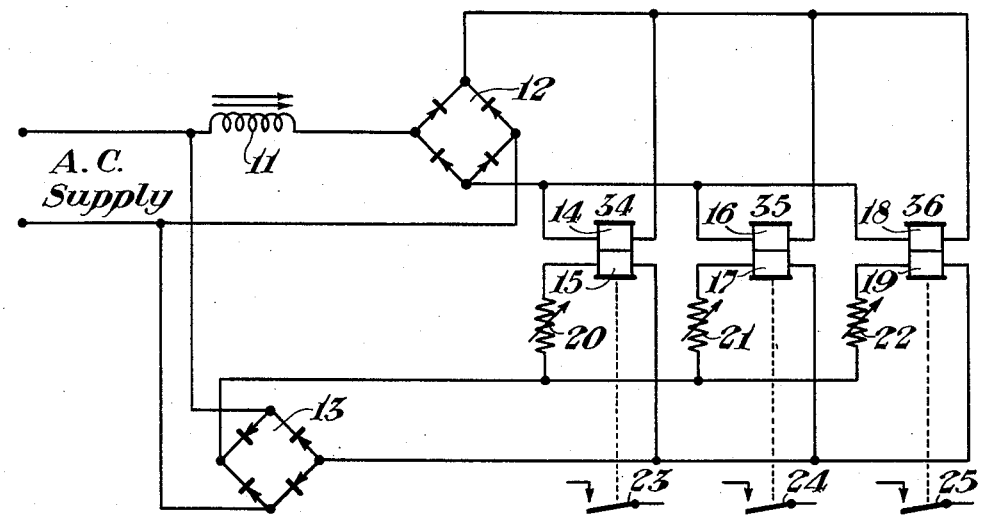
Fig. 1 is a schematic illustration of an embodiment of the invention.

The control system embodied in this invention in its preferred form comprises generally a series of differential relays each having one winding connected in a parallel arrangement to a source of voltage and each having its other winding connected in an opposing sense to the same source of voltage through a circuit including an inductance coil wound on an iron core.

At a point anterior to the location of a car retarder the web of the track rail is removed from a short section of the track to create a sensing rail and the inductance coil is placed in the space thus formed between the rail head and the flange. The coil is proportioned so that when one of its ends is in contact with the rail flange there is an air gap between its other end and the rail head. This air gap is included in a magnetic flux path which includes the iron core, the rail flange, the rail web, the rail head and the air gap as indicated by the dotted lines in Fig. 2.

It may readily be seen that as cars pass over the unsupported portion of the rail head overlying the iron core the rail head will be deflected to partially close the air gap. The amplitude of the rail deflection will vary in accordance with the different weights of the passing cars, causing the air gap to be closed by a corresponding amount. As a result the coil inductance or resistance or both will increase and the voltage applied to the differential relay windings which are in series with the coil will be reduced accordingly and when the reduction is of sufficient magnitude, current passing through the other windings of the relays will cause the relays to pick up. The relays are calibrated to operate at different voltage differentials in accordance with the rail deflection which will be produced by cars of different weights. For example, three relays may be used, as illustrated, each calibrated by means of a related series variable resistor to operate successively in response to the passing of a light weight car, a medium weight car or a heavy weight car.

The braking apparatus is not shown since it is immaterial to the control system just what form such apparatus assumes. It is deemed sufficient for the purposes of this disclosure to show a contact of each of the relays and to state that the means for applying braking force are controlled by the contacts of the relays and that braking force will vary in accordance with which of the relays is picked up in response to the passage of a car over the unsupported portion of the rail head. For details of a braking system which can be controlled in such a manner reference is made to Patent No. 2,331,125 issued on October 5, 1943, in the name of J. W. Logan, Jr. for "Railway Braking Apparatus" and to application Serial No. 473,819, now Patent No. 2,819,682, for "Car Retarder Speed Control Apparatus" filed December 8, 1954, in the name of Edward C. Falkowski.

To carry out the plan for compensating for changes in supply voltage and in the environment of the control, the control is first of all divided into two substantially similar circuits, as was hereinbefore related. One of the circuits may be considered as constituting the reference circuit and comprises a rectifier of the oxide type, preferably copper oxide, connected to a source of alternating current power and having connected across its output, in parallel with each other, one winding of each of the relays in the control. There is also a calibrating resistor for each winding connected in series with its associated winding across the output of the rectifier. The other circuit includes a rectifier substantially identical to the first mentioned rectifier connected to the same source of alternating current in series with an inductance coil, and having connected across its output the opposing winding of each of the relays in parallel with each other. The inductance winding constitutes a part of the weight sensitive element of the control. Each of the rectifiers is fed from the same source of voltage so that supply voltage variations will affect each one similarly under all conditions. In addition, the use of copper oxide type rectifiers at least partially compensates for deviation in voltage drops across each of the circuit elements due to changes resulting from changes in the ambient temperature of the elements. The rectifier will have a lower resistance as temperature rises while resistance of the other elements of the circuit will increase as temperature rises. The tendency then will be to have substantially equal current flow through the relay windings at prescribed settings of the calibrating resistors and of the air gap in the inductance even though the temperature varies.

The ability of the system to compensate for temperature variations is further enhanced by choosing the inductance and compensating resistors so that the inductance and the resistors will present substantially equal impedance at equilibrium. That is, when there is no vehicle in the area of the roadway sensitive to the presence of a vehicle and the system is calibrated to properly detect and indicate light, medium and heavy weight vehicles, the effective resistance or impedance of the inductance coil will be approximately equal to the effective impedance of the resistors and a given change in ambient temperature of the environment of the control will produce substantially equal changes in the impedance of the inductance coil and of the resistances.

Figure 2:
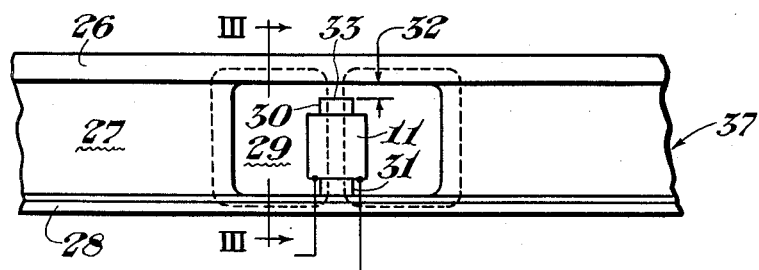
Fig. 2 shows the physical arrangement of the inductive winding with respect to the rails in accordance with the invention.
Figure 3:
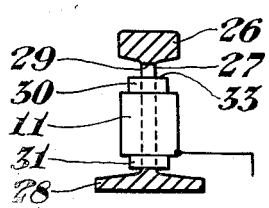
Fig. 3 is a sectional view taken along the line III—III of Fig. 2.

Referring more specifically now to Fig. 2 of the drawings the numeral 37 indicates a track rail having a rail head 26, a web 27 and a flange 28. The rail has a portion of its web removed to provide a slot or opening 29 in which is mounted an inductive winding 11 having an iron core 30. The unsupported portion of the rail head may be called the sensing rail. The winding is placed in the opening so that one end 31 of the iron core contacts the flange portion of the rail and the core is proportioned so that its other end 33 is spaced from the rail head leaving an air gap 32.

As shown diagrammatically in Fig. 1, the inductance 11 is placed in a series circuit with a full wave rectifier 12, the input terminals of which are connected to a source of alternating current voltage. The output of the rectifier is fed to relay coils 14, 16 and 18 of differential relays 34, 35 and 36, respectively, which are connected in parallel with each other. Relay windings 14, 16 and 18 are connected to oppose the picking up of contacts 23, 34 and 25 of the relays by relay windings 15, 17 and 19. Relay windings 15, 17 and 19 are connected in parallel with each other across the output of a full wave rectifier 13 which is supplied with current from the same source of alternating current voltage as rectifier 12. It may be seen that for practical purposes, if the two rectifiers 12 and 13 have similar characteristics, the voltage applied to relay windings 15, 17 and 19 will exceed the voltage applied to the opposing relay windings 14, 16 and 18 by an amount equal to the voltage drop across the inductance 11. Resistors 20, 21 and 22 are inserted in series with relay windings 15, 17 and 19, respectively, and have a two-fold purpose. First of all the resistors are chosen so that their effective impedance, as explained before, will approximately equal the effective impedance of the inductance 11 so that the change in impedance caused in the inductance 11 by variations in ambient temperature will approximately equal and be cancelled out by changes in effective impedance of the resistors. Thus, ambient temperature variations will not disturb the equilibrium between the two circuits. Secondly, these resistors are used to calibrate the relays so that one relay will operate when a light car passes, another of the relays will not operate unless a car of at least medium weight passes and the third relay will operate only if a car of a heavy weight passes the control. The relays, the resistors and the inductance are chosen so that with the track unoccupied there is insufficient voltage differential to effect operation of relays 34, 35 or 36 to pick up their contacts. However, as a car wheel passes over the sensing rail, the rail head is deflected toward the end 33 of the core 30 reducing the air gap 32 and increasing the impedance of coil 11. The deflection of the rail is proportional to the weight of the car and, since the impedance of the coil will change in proportion to the variation of the air gap, the change produced in the impedance of the coil is also proportional to the weight of the car. An increase in impedance or inductance of coil 11 will cause a proportionate decrease in the voltage applied to the windings 14, 16 and 18 so that the differential between the current flowing in these windings and the current in windings 15, 17 and 19 becomes sufficient to pick up one or more of the relays.

Calibration of the relays so that the system will distinguish between light, medium and heavy weight cars for proper control of a car retarder is accomplished, as was previously stated, by adjustment of variable resistors 20, 21 and 22 which are inserted in series with the windings 15, 17 and 19, respectively. The resistors are adjusted to control the current flowing in each of windings 15, 17 and 19 so that the operation of relays 34, 35 and 36 will occur at different values of impedance of coil 11. For example, resistor 20 may be adjusted so that relay 34 will operate when coil 11 limits the output of rectifier 12 to the voltage resulting when a light weight car passes over the sensing rail, resistor 21 may be set so that relay 35 will operate when the sensing rail is deflected by a car of medium weight and resistor 22 may be adjusted to permit operation of relay 36 only when the air gap 32 is closed by an amount equal to the deflection of the unsupported rail head under the load of a heavy car.

The relays may control the application of braking force individually or in combination with each other and the control of braking force may be accomplished directly through the relays or by manual operation in accordance with indicators controlled by the relays. For example, relay 36 through its contact 25 may control the application of a heavy braking force either directly or by activating other control circuits or the application of the heavy braking force may depend upon the operation of relays 34, and 35 as well as relay 36 or the relays may control lamps or other indicators observed by an operator who will then manipulate a manual control to cause the proper braking force to be applied.

The system may readily be modified to operate with relays 34, 35 and 36 normally energized and their contacts closed. In that case flux produced by current flowing in windings 14, 16 and 18 would predominate and hold the contacts closed. As the air gap 32 decreased, due to deflection of the sensing rail by a passing car, the impedance of the inductance coil 11 would be increased, limiting the current through windings 14, 16 and 18 and reducing the flux produced by these windings. The relays would release in accordance with the weight of the car and the calibration of resistors 20, 21 and 22.

With the system properly calibrated and the sensing rail unoccupied, the condition of the control in its preferred form would be as follows: current limited by resistors 20, 21 and 22 would flow in relay windings 15, 17 and 19 producing a flux tending to pick up each of the relays 34, 35 and 36, respectively, current limited by inductance 11 would flow in windings 14, 16 and 18 producing a bucking flux and thereby opposing the picking up of the relays, the differential flux would be insufficient to pick up the relays so that relays 34, 35 and 36 would be down and their contacts open. Resistance 20 would be adjusted to limit the current through relay winding 15 to a value sufficient to pick up relay 34 when the current through relay winding 14 would decrease to the value resulting when the impedance of the inductance coil 11 increased by an amount equal to the increase in impedance caused by the passing of a light car over the sensing rail. Similarly, resistors 21 and 22 would be adjusted to limit the current through windings 17 and 19, respectively, such that relays 35 and 36 would pick up when the impedance of coil 11 increased by an amount indicating the passage of a medium or of a heavy weight car. Inductance 11, in series with the rectifier 12, causes the voltage output of rectifier 12 to be somewhat less than the output of rectifier 13. This reduction, however, is insufficient when the sensing rail is unoccupied to limit the current through the windings 14, 16 and 18 to a value which will permit either of the relays 34, 35 or 36 to be picked up by the flow of current in windings 15, 17 and 19.

Let us assume now that a car, say of medium weight, passes over the sensing rail. The weight of the car on the sensing rail will deflect the rail toward the end 33 of the core 30 partially closing the air gap 32. When this occurs the electrical characteristics of coil 11 are changed and its impedance in the circuit will increase causing a further reduction in the voltage output of rectifier 12. Less current will now flow in relay windings 14, 16 and 18 and in accordance with the calibration of resistors 20, 21 and 22 this reduction in current will be sufficient to allow current flowing through winding 17 of relay 35 to pick up that relay. The differential current flowing in winding 15 of relay 34 will also exceed the value required to pick up relay 34 but the change will be insufficient to pick up relay 36. Contact 24 of relay 35 will close and may be employed to operate an indicator or to directly control the braking force to be applied by an automatic car retarder which the car is approaching. As each wheel of the car leaves the sensing rail, the rail will return to its normal position increasing the air gap 32, the impedance of coil 11 will decrease and the differential current flowing through winding 17 of relay 35 and winding 15 of relay 34 will be insufficient to keep the relays in their picked up condition. The system will then return to the conditions existing when the sensing rail is unoccupied and after the last wheel of a particular car passes the system will be ready for acceptance of the next vehicle.

In a typical application of the invention with a 60 cycle exciting voltage applied to the control and an initial air gap of 0.010 inch, measurements were taken to determine the nature of the changes in the characteristics of the coil caused by reducing the air gap. It was found that as the air gap was changed from 0.010 inch to zero the impedance of the coil increased by 62% while the effective resistance increased by 173%. The magnitude of the change in effective resistance is probably due to the fact that the rail, which forms a part of the flux path for the coil, because of its non-laminar structure introduces large eddy current and hysteresis losses which apparently are reflected as resistance in the coil.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In a vehicle weighing device, a roadway having a magnetic portion, an electrical circuit, means for providing an input signal to said electrical circuit, inductive means including the magnetic portion of the roadway and responsive to the weight of a vehicle traversing the roadway to change its electrical characteristics in proportion to the weight of the vehicle, said inductive means being connected electrically to the electrical circuit and affecting the input signal thereto and a plurality of relays included in said electrical circuit, each of said relays being responsive to a different degree of change in the input signal to thereby indicate the degree to which the input signal is changed.

2. In a vehicle weighing device, a roadway having a portion constructed of a magnetic metal, a slot formed in said magnetic portion, an electrical circuit, means for providing an input signal to said electrical circuit, an inductance wound on a core of magnetic metal and positioned in said slot so that the core of the inductance and the metallic portion of the roadway form a magnetic flux path interrupted by an air gap, the metallic portion of the roadway being constructed to deflect under the weight of a vehicle and close the air gap to a greater or lesser degree depending on the weight of a vehicle on the roadway and thereby proportionately change the electrical characteristics of the inductance, the inductance being connected electrically to the electrical circuit in a manner to affect the input signal in proportion to the weight of a vehicle on the roadway, and means included in the electrical circuit for sensing changes in the input signal and thereby indicate the relative weight of a vehicle on the roadway.

3. In a vehicle-weight sensing device, a roadway traversed by the vehicles to be weighed and having a portion constructed of a magnetic metal, an inductance wound on a core of magnetic metal and arranged with respect to said magnetic portion of the roadway in a manner such that the core of the inductance and the metallic portion of the roadway form a flux path interrupted by an air gap, said metallic portion of the roadway deflecting under the weight of a passing vehicle to close the air gap to a greater or lesser degree in proportion to the weight of the passing vehicle and thereby change the electrical characteristics of the inductance, the relative change in characteristics of the inductance thereby indicating the relative weight of a vehicle on the roadway and means to minimize the result of the effect of variations in ambient temperatures on the electrical characteristics of the inductance.

4. In a vehicle-weight comparing device, a roadway having a magnetic portion, said magnetic portion having an appreciable dimension transverse to the surface of the roadway and having a slot cut through the portion lying transverse of the surface of the roadway whereby the rigidity of the roadway lying above the slot is reduced, a core of magnetic material mounted in the slot so that an air gap remains between one end of the core and the closest adjacent boundary of the slot and an inductive winding on said core, the magnetic portion of the roadway deflecting under the weight of the passing vehicle to reduce the air gap and change the electrical characteristics of the inductance in proportion to the weight of a passing vehicle, and means to minimize the result of the effect of variations in ambient temperatures on the electrical characteristics of the inductance.

5. In a vehicle-weight comparing device, a roadway having a magnetic portion, an electrical circuit, means for providing an input signal to said electrical circuit, a magnetic portion of the roadway having an appreciable dimension transverse to the surface of the roadway and having a slot through the transverse portion whereby the rigidity of the roadway lying above the slot is reduced, a core of magnetic material mounted in the slot so that an air gap remains between one end of the core and the closest adjacent boundary of the slot, an inductive winding on said core, the magnetic portion of the roadway deflecting under the weight of the vehicle on the roadway to reduce the air gap proportionately to the weight of a passing vehicle to thereby change the electrical characteristics of the inductive winding, said inductive winding being connected electrically to the electrical circuit and affecting the input signal thereto in proportion to the change in electrical characteristics, and means included in said electrical circuit for indicating the degree to which the input signal is changed.

6. In a vehicle-weight comparing device, a roadway having a magnetic portion, an electrical circuit, means for providing an input signal to said electrical circuit, the magnetic portion of the roadway having an appreciable dimension transverse to the surface of the roadway and having a slot through the transverse portion, a core of magnetic material mounted in the slot so that an air gap remains between one end of the core and the closest adjacent boundary of the slot, an inductive winding on said core, the magnetic portion of the roadway deflecting under the weight of the vehicle on the roadway to reduce the air gap proportionately to the weight of a passing vehicle to thereby change the electrical characteristics of the inductive winding, said inductive winding being connected electrically to the electrical circuit and affecting the input signal thereto in proportion to the change in electrical characteristics and a plurality of relays included in said electrical circuit for sensing the degree to which the input signal is changed and to indicate the comparative relative weight of a vehicle on the roadway.

7. In a system for selecting electrical circuits in accordance with the weight of a vehicle, a roadway having a portion constructed of a magnetic material, a source of current, a core of magnetic material associated with said magnetic portion of the roadway to form a magnetic flux path interrupted by an air gap, an inductive winding on said core, a plurality of differential relays each having one of its windings connected through the inductive winding to the source of current, a plurality of variable resistances, one for each of said relays, and the other windings of said differential relays being connected one each through a corresponding one of the resistances to the source of current, the resistances being adjusted to cause each of the relays to pick up with a different value of current flowing through said one of their windings, the magnetic portion of the roadway being deflected by a passing vehicle to reduce the air gap in proportion to the relative weight of the vehicle and the winding on the core changing its electrical characteristics in response to the closing of the air gap to cause the relays to pick up selectively in relation to the weight of the vehicle on the roadway.

8. In a railway car weighing system comprising a track rail having a portion of the web removed to form a slot, an iron core mounted in the slot and arranged so that the iron core in cooperation with the track rail provides a magnetic flux path interrupted by an air gap, an inductive winding on said core, the rail head adjacent the core deflecting under the weight of a passing car to reduce the air gap and thereby change the electrical characteristics of the winding to a degree corresponding to the relative weight of the passing car and a plurality of relays for detecting the relative change in the electrical characteristics of the winding and to indicate the weight of a passing car.

9. A railway car weighing device comprising a track rail having a portion of the web removed to form a slot, an iron core supported within the slot so that the core in cooperation with the track rail forms a flux path interrupted by an air gap, a coil wound on the core, the rail head adjacent the core deflecting under the weight of a passing car to reduce the air gap in proportion to the weight of the passing car to thereby change the electrical characteristics of the coil, and means responsive to the change in electrical characteristics of the coil to indicate the weight of the passing car.

10. A railway car weighing device comprising a track rail having a portion of the web removed to form a slot, an iron core inductive winding mounted in the slot so that the core in cooperation with the track rail forms a magnetic flux path interrupted by an air gap, a source of current, a plurality of differential relays each having one of its windings connected to said source of current, the other winding of each of said differential relays being connected to the same source of current through the coil, the rail head adjacent the core deflecting under the weight of a passing car to reduce the air gap in proportion to the weight of the passing car to thereby change the electrical characteristics of the coil and consequently to change the magnitude of the current flowing through said other windings of the relays and means for calibrating the relays to pick up in response to different values of currents flowing in their said other windings to thereby indicate the relative weight of a passing car.

11. A railway car weighing device comprising a track rail having a portion of the web removed to form a slot, an iron core inductive winding mounted in the slot so that the core in cooperation with the track rail forms a magnetic flux path interrupted by an air gap, a source of current, a plurality of differential relays each having one of its windings connected to said source of current, the other winding of each of said differential relays being connected to the same source of current through the coil, the rail head adjacent the core deflecting under the weight of a passing car to reduce the air gap in proportion to the weight of the passing car to thereby change the electrical characteristics of the coil and consequently to change the magnitude of the differential current flowing through the windings of the relays and a plurality of variable resistances, one associated with each relay, in series with said one winding of the relay and adjustable to calibrate the relays to pick up in response to changes in electrical characteristics of the coil corresponding to different weights of cars.

12. In a control system for an automatic car retarder, a track rail having a portion of the web of the rail removed to provide a slot, the head of the rail overlying the slot forming a sensing rail which will deflect under the weight of a car on the rail in proportion to the weight of the car, inductive means for detecting the deflection of the sensing rail and for generating a signal in accordance with the relative amplitude of the deflection, means to minimize the result of the effect of variations in ambient temperatures on the electrical characteristics of the coil, and control means for utilizing the signal output of the inductive means.

13. A control system for an automatic car retarder governed through electrical circuits, the system comprising a track rail having a portion of the web removed to provide a slot, means for providing an electrical signal, inductive means located in the slot for detecting the deflection of the rail head overlying the slot under the weight of a vehicle and for modifying the electrical signal to a degree proportional to the amplitude of the deflection of the rail head, and control means including a plurality of relays energized in accordance with the modified signal.

14. A control system for an automatic car retarder, the system comprising a track rail in approach relation to said car retarder, said track rail having a portion of the web removed to provide a slot, the rail head overlying the slot deflecting under the weight of a passing car, the amplitude of the deflection indicating the weight class of the car, inductive means within the slot in the rail responsive to deflection of the rail head to change its electrical characteristics proportionately thereto, and means including a plurality of relays selectively operable in accordance with the degree of change in electrical characteristics of said inductive means to select corresponding circuits from a plurality of electrical circuits.

15. A system for controlling the application of braking force by an automatic car retarder, the system comprising a track rail in approach relation with respect to said car retarder, said track rail having a portion of its web removed to provide a slot extending through the web of the rail, the portion of the rail head overlying the slot forming a sensing rail, a core in said slot, an inductive winding on said core, the core in cooperation with the track rail forming a magnetic flux path interrupted by an air gap adjacent said sensing rail, the sensing rail deflecting under the weight of a passing car to reduce said air gap to cause a change in electrical characteristics of said winding, means for detecting the degree of change in electrical characteristics of the winding, and control means energized in accordance with the detected degree of change in electrical characteristics of the winding.

16. In a control system for an automatic car retarder, a track rail, a source of electrical power, a plurality of differential relays having one each of their windings connected to said source of power, a plurality of variable calibrating resistances one each in series with one of said windings, said relays having their opposing windings connected to the same source of power, inductive means including a portion of said track rail and being connected in series with the opposing windings of the relays, said inductive means being responsive to the weight of the passing car on the rail to change its electrical characteristics to thereby cause a change in voltage applied to said opposing windings and cause selective operation of the relays in accordance with the calibration thereof.

17. In a control system for an automatic car retarder, a track rail in approach relation with respect to said car retarder, said track rail having a portion of the web removed to provide a slot, a metallic core in the slot having one of its ends rigidly secured in the flange of the rail and its other end terminating in spaced relation to the rail head so that the core in cooperation with the track rail forms a magnetic flux path interrupted by an air gap, a source of alternating current, a full wave rectifier, a plurality of differential relays each having one winding connected across the output of said rectifier, a plurality of variable resistances, each in series with one of said relay windings, another full wave rectifier, an inductance coil wound on said core and connected in series with said other full wave rectifier across the same source of alternating current, the opposing windings of each differential relay being connected in parallel with each other across the output of said other full wave rectifier, the portion of the rail head overlying said core deflecting under the weight of a passing car to reduce the air gap between the rail head and the core to thereby change the electrical characteristics of the inductance coil, the degree of change of electrical characteristics of said inductance coil determining the amplitude of differential voltage applied to the coils of the relays to thereby control the picking up of said relays and contacts on said relays for controlling circuits, and means to compensate, at least in part, for changes in the electrical characteristics of the coil due to variations in ambient temperatures.

18. A railway car weighing system comprising a track rail having a portion of its web removed to provide a slot, the rail head overlying the slot deflecting under the weight of a passing car, the amplitude of the deflection being proportional to the weight of the car, inductive means within the slot in the rail responsive to deflection of the rail head to change its electrical characteristics proportionately thereto, and relay means for detecting the degree of change in the electrical characteristics of said inductive means to thereby classify the car as to weight.

References Cited in the file of this patent

UNITED STATES PATENTS

| | | |
|---|---|---|
| 1,923,745 | Platzer | Aug. 22, 1933 |
| 2,331,125 | Logan | Oct. 5, 1943 |
| 2,351,606 | Gold et al. | June 20, 1944 |
| 2,357,475 | Kane | Sept. 5, 1944 |
| 2,623,386 | Baker | Dec. 30, 1952 |
| 2,688,740 | Merrill et al. | Sept. 7, 1954 |

FOREIGN PATENTS

| | | |
|---|---|---|
| 829,805 | Germany | Jan. 28, 1952 |
| 195,793 | Great Britain | Apr. 12, 1923 |

UNITED STATES PATENT OFFICE
CERTIFICATE OF CORRECTION

Patent No. 2,866,137                                December 23, 1958

Herman G. Blosser

It is hereby certified that error appears in the printed specification of the above numbered patent requiring correction and that the said Letters Patent should read as corrected below.

Column 7, line 75, after "relays," strike out "and".

Signed and sealed this 7th day of April 1959.

(SEAL)
Attest:

KARL H. AXLINE
Attesting Officer

ROBERT C. WATSON
Commissioner of Patents